United States Patent
Chutorash et al.

(10) Patent No.: US 8,200,214 B2
(45) Date of Patent: Jun. 12, 2012

(54) WIRELESS NETWORK SELECTION

(75) Inventors: Richard J. Chutorash, Oakland Township, MI (US); Brian K. Servis, Holland, MI (US); Peter C. Laux, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 502 days.

(21) Appl. No.: 12/422,173

(22) Filed: Apr. 10, 2009

(65) Prior Publication Data

US 2010/0041397 A1    Feb. 18, 2010

Related U.S. Application Data

(63) Continuation of application No. PCT/US2007/080970, filed on Oct. 10, 2007.

(60) Provisional application No. 60/851,030, filed on Oct. 11, 2006.

(51) Int. Cl.
*H04W 88/02* (2009.01)

(52) U.S. Cl. .................................................. 455/432.1

(58) Field of Classification Search .............. 455/41.2, 455/67.11, 406, 411, 433, 432.1, 450, 456.1, 455/469.2, 569.2; 370/311, 312, 329, 331, 370/338, 254; 701/33, 36, 117, 200; 726/4; 709/223; 340/425.5
See application file for complete search history.

(56) References Cited

U.S. PATENT DOCUMENTS

| | | | |
|---|---|---|---|
| 4,297,528 A | 10/1981 | Beno | |
| 4,389,109 A | 6/1983 | Taniguchi et al. | |
| 4,394,538 A | 7/1983 | Warren et al. | |
| 4,401,852 A | 8/1983 | Noso et al. | |
| 4,415,767 A | 11/1983 | Gill et al. | |
| 4,450,545 A | 5/1984 | Kishi et al. | |
| 4,462,080 A | 7/1984 | Johnstone et al. | |
| 4,493,100 A | 1/1985 | Moriyama et al. | |
| 4,501,012 A | 2/1985 | Kishi et al. | |
| 4,506,377 A | 3/1985 | Kishi et al. | |
| 4,506,378 A | 3/1985 | Noso et al. | |
| 4,509,133 A | 4/1985 | Monbaron et al. | |

(Continued)

FOREIGN PATENT DOCUMENTS

DE    34 17 956 A1    11/1985

(Continued)

OTHER PUBLICATIONS

U.S. Appl. No. 10/326,620, filed Dec. 20, 2002, Witkowski et al.

(Continued)

*Primary Examiner* — Diane Mizrahi
(74) *Attorney, Agent, or Firm* — Foley & Lardner LLP

(57) ABSTRACT

A method is provided for connecting an in-vehicle communication system to a plurality of wireless communication networks, including a mobile telephony network and an internet protocol network. The in-vehicle communication system is configured to roam between the plurality of wireless communication networks, wherein the method includes the step of receiving a first wireless communication signal from one of the plurality of wireless communication networks. The method also includes the step of detecting a second wireless communication signal from a second of the plurality of wireless communication signals. The method further includes the step of determining an intensity level of the first and second wireless communication signals. The method further includes the step of switching the in-vehicle communication system to one of the plurality of wireless communication networks based on the intensity level of the first and second wireless communication signals.

17 Claims, 6 Drawing Sheets

U.S. PATENT DOCUMENTS

| | | |
|---|---|---|
| 4,516,207 A | 5/1985 | Moriyama et al. |
| 4,528,687 A | 7/1985 | Noso et al. |
| 4,532,648 A | 7/1985 | Noso et al. |
| 4,538,295 A | 8/1985 | Noso et al. |
| 4,558,459 A | 12/1985 | Noso et al. |
| 4,637,045 A | 1/1987 | Noso et al. |
| 4,644,107 A | 2/1987 | Clowes et al. |
| 4,731,811 A | 3/1988 | Dubus |
| 4,827,520 A | 5/1989 | Zeinstra |
| 4,845,738 A | 7/1989 | Takano |
| 4,875,229 A | 10/1989 | Palett et al. |
| 4,905,270 A | 2/1990 | Ono |
| 5,113,182 A | 5/1992 | Suman et al. |
| 5,278,547 A | 1/1994 | Suman et al. |
| 5,333,177 A | 7/1994 | Braitberg et al. |
| 5,343,399 A | 8/1994 | Yokoyama et al. |
| 5,416,828 A | 5/1995 | Hiramatsu et al. |
| 5,444,761 A | 8/1995 | Nagashima |
| 5,475,366 A | 12/1995 | Van Lente et al. |
| 5,479,155 A | 12/1995 | Zeinstra et al. |
| 5,479,157 A | 12/1995 | Suman et al. |
| 5,479,474 A | 12/1995 | Schwartzman et al. |
| 5,479,479 A | 12/1995 | Braitberg et al. |
| 5,490,213 A | 2/1996 | Huang |
| 5,500,880 A | 3/1996 | Kellermann |
| 5,535,274 A | 7/1996 | Braitberg et al. |
| 5,555,286 A | 9/1996 | Tendler |
| 5,556,017 A | 9/1996 | Troy |
| 5,559,880 A | 9/1996 | Shiono |
| 5,561,704 A | 10/1996 | Salimando |
| 5,583,485 A | 12/1996 | Van Lente et al. |
| 5,584,052 A | 12/1996 | Gulau et al. |
| 5,604,470 A | 2/1997 | Atokawa |
| 5,614,885 A | 3/1997 | Van Lente et al. |
| 5,614,891 A | 3/1997 | Zeinstra et al. |
| 5,619,190 A | 4/1997 | Duckworth et al. |
| 5,625,673 A | 4/1997 | Grewe et al. |
| 5,627,529 A | 5/1997 | Duckworth et al. |
| 5,627,547 A | 5/1997 | Ramaswamy et al. |
| 5,631,947 A | 5/1997 | Wittstein et al. |
| 5,632,521 A | 5/1997 | Archambault et al. |
| 5,646,701 A | 7/1997 | Duckworth et al. |
| 5,651,056 A | 7/1997 | Eting et al. |
| 5,659,594 A | 8/1997 | Toda |
| 5,659,887 A | 8/1997 | Ooe |
| 5,661,455 A | 8/1997 | Van Lente et al. |
| 5,661,651 A | 8/1997 | Geschke et al. |
| 5,691,848 A | 11/1997 | Van Lente et al. |
| 5,699,044 A | 12/1997 | Van Lente et al. |
| 5,699,054 A | 12/1997 | Duckworth |
| 5,699,055 A | 12/1997 | Dykema et al. |
| 5,708,415 A | 1/1998 | Van Lente et al. |
| 5,715,522 A | 2/1998 | Vimpari et al. |
| 5,717,387 A | 2/1998 | Suman et al. |
| 5,732,074 A | 3/1998 | Spaur et al. |
| 5,751,251 A | 5/1998 | Hutchinson |
| 5,754,962 A | 5/1998 | Griffin |
| 5,758,300 A | 5/1998 | Abe |
| 5,767,788 A | 6/1998 | Ness |
| 5,771,303 A | 6/1998 | Mazzarella et al. |
| 5,797,088 A | 8/1998 | Stamegna |
| 5,802,167 A | 9/1998 | Hong |
| 5,803,325 A | 9/1998 | Wang |
| 5,809,135 A | 9/1998 | Chang |
| 5,810,420 A | 9/1998 | Welling |
| 5,822,427 A | 10/1998 | Braitberg et al. |
| 5,828,750 A | 10/1998 | Perälä |
| 5,832,390 A | 11/1998 | Irvin |
| 5,836,563 A | 11/1998 | Hsin-Yung |
| 5,839,919 A | 11/1998 | Chen |
| 5,844,473 A | 12/1998 | Kaman |
| 5,844,987 A | 12/1998 | Matthews et al. |
| 5,854,593 A | 12/1998 | Dykema et al. |
| 5,859,472 A | 1/1999 | DiStefano et al. |
| 5,859,628 A | 1/1999 | Ross et al. |
| 5,860,824 A | 1/1999 | Fan |
| 5,864,603 A | 1/1999 | Haavisto et al. |
| 5,878,360 A | 3/1999 | Nishino et al. |
| 5,889,472 A | 3/1999 | Nagel et al. |
| 5,889,474 A | 3/1999 | LaDue |
| 5,896,375 A | 4/1999 | Dent et al. |
| 5,898,392 A | 4/1999 | Bambini et al. |
| 5,903,226 A | 5/1999 | Suman et al. |
| 5,917,907 A | 6/1999 | Kela |
| 5,926,087 A | 7/1999 | Busch et al. |
| 5,940,502 A | 8/1999 | Hirai et al. |
| 5,966,285 A | 10/1999 | Sellers |
| 5,967,851 A | 10/1999 | Ozer et al. |
| 5,974,333 A | 10/1999 | Chen |
| 5,974,334 A | 10/1999 | Jones, Jr. |
| 5,982,149 A | 11/1999 | Shih |
| 5,990,840 A | 11/1999 | Chang |
| 5,992,807 A | 11/1999 | Tarulli |
| 5,995,824 A | 11/1999 | Whitfield |
| 5,995,898 A | 11/1999 | Tuttle |
| 6,009,320 A | 12/1999 | Dudley |
| 6,023,241 A | 2/2000 | Clapper |
| 6,028,537 A | 2/2000 | Suman et al. |
| 6,031,492 A | 2/2000 | Griffin et al. |
| 6,038,441 A | 3/2000 | Slaven et al. |
| 6,052,603 A | 4/2000 | Kinzalow et al. |
| 6,055,468 A | 4/2000 | Kaman et al. |
| 6,056,175 A | 5/2000 | Mieglitz et al. |
| 6,058,184 A | 5/2000 | Frank |
| 6,058,298 A | 5/2000 | Stamegna |
| 6,058,319 A | 5/2000 | Sadler |
| 6,059,558 A | 5/2000 | Buzzell et al. |
| 6,059,588 A | 5/2000 | Tung et al. |
| 6,069,558 A | 5/2000 | Kershaw |
| 6,069,588 A | 5/2000 | O'Neill, Jr. |
| 6,076,777 A | 6/2000 | Färm |
| 6,078,252 A | 6/2000 | Kulczycki et al. |
| 6,081,237 A | 6/2000 | Sato et al. |
| 6,085,078 A | 7/2000 | Stamegna |
| 6,101,403 A | 8/2000 | Masuda |
| 6,108,566 A | 8/2000 | Albanese et al. |
| 6,108,567 A | 8/2000 | Hosonuma |
| 6,122,514 A | 9/2000 | Spaur et al. |
| 6,128,482 A | 10/2000 | Nixon et al. |
| 6,134,456 A | 10/2000 | Chen |
| 6,138,041 A | 10/2000 | Yahia |
| 6,144,114 A | 11/2000 | Chutorash |
| 6,148,212 A | 11/2000 | Park et al. |
| 6,154,148 A | 11/2000 | Fluharty et al. |
| 6,154,663 A | 11/2000 | Itamochi |
| 6,163,711 A | 12/2000 | Juntunen et al. |
| 6,169,955 B1 | 1/2001 | Fultz |
| 6,173,195 B1 | 1/2001 | Chen |
| 6,177,905 B1 | 1/2001 | Welch |
| 6,198,947 B1 | 3/2001 | Barber |
| 6,202,008 B1 | 3/2001 | Beckert et al. |
| 6,209,767 B1 | 4/2001 | Liou |
| 6,215,449 B1 | 4/2001 | O'Neill, Jr. |
| 6,218,958 B1 | 4/2001 | Eichstaedt et al. |
| 6,226,497 B1 | 5/2001 | Güntzer et al. |
| 6,226,529 B1 | 5/2001 | Bruno et al. |
| 6,230,030 B1 | 5/2001 | Lu |
| 6,236,333 B1 | 5/2001 | King |
| 6,240,303 B1 | 5/2001 | Katzur |
| 6,246,766 B1 | 6/2001 | Walsh |
| 6,285,757 B1 | 9/2001 | Carroll et al. |
| 6,304,764 B1 | 10/2001 | Pan |
| 6,308,083 B2 | 10/2001 | King |
| 6,320,514 B1 | 11/2001 | Flick |
| 6,326,613 B1 | 12/2001 | Heslin et al. |
| 6,340,928 B1 | 1/2002 | McCurdy |
| 6,345,102 B1 | 2/2002 | Davis et al. |
| 6,349,222 B1 | 2/2002 | Hafiz |
| 6,356,645 B1 | 3/2002 | Trenkle |
| 6,363,156 B1 | 3/2002 | Roddy |
| 6,366,213 B2 | 4/2002 | DeLine et al. |
| 6,377,172 B1 | 4/2002 | Neer |
| 6,377,825 B1 | 4/2002 | Kennedy et al. |
| 6,389,337 B1 | 5/2002 | Kolls |
| 6,397,086 B1 | 5/2002 | Chen |
| 6,408,232 B1 | 6/2002 | Cannon et al. |
| 6,484,040 B1 | 11/2002 | Wang |

| | | |
|---|---|---|
| 6,505,057 B1 | 1/2003 | Finn et al. |
| 6,516,192 B1 | 2/2003 | Spaur et al. |
| 6,522,754 B1 | 2/2003 | Long et al. |
| 6,532,374 B1 | 3/2003 | Chennakeshu et al. |
| 6,542,758 B1 | 4/2003 | Chennakeshu et al. |
| 6,549,130 B1 | 4/2003 | Joao |
| 6,549,793 B1 | 4/2003 | Baratono |
| 6,549,973 B1 | 4/2003 | Kibashi et al. |
| 6,560,344 B1 | 5/2003 | Julstrom et al. |
| 6,600,430 B2 | 7/2003 | Minagawa et al. |
| 6,625,426 B2 | 9/2003 | Baratono et al. |
| 6,735,630 B1 * | 5/2004 | Gelvin et al. ............... 709/224 |
| 6,765,471 B1 | 7/2004 | Baudard et al. |
| 6,906,632 B2 | 6/2005 | DeLine et al. |
| 7,047,039 B2 | 5/2006 | Lalley |
| 7,106,171 B1 | 9/2006 | Burgess |
| 7,113,857 B2 | 9/2006 | Ilan et al. |
| 7,257,426 B1 | 8/2007 | Witkowski et al. |
| 7,346,374 B2 | 3/2008 | Witkowski et al. |
| 7,349,722 B2 | 3/2008 | Witkowski et al. |
| 2001/0007086 A1 | 7/2001 | Rogers et al. |
| 2001/0011302 A1 | 8/2001 | Son |
| 2001/0045774 A1 | 11/2001 | Rode |
| 2001/0055165 A1 | 12/2001 | McCarthy et al. |
| 2002/0004702 A1 | 1/2002 | Ruhl |
| 2002/0013138 A1 | 1/2002 | Benthin et al. |
| 2002/0013730 A1 | 1/2002 | Bigus |
| 2002/0025832 A1 | 2/2002 | Durian et al. |
| 2002/0032510 A1 | 3/2002 | Turnbull et al. |
| 2002/0039417 A1 | 4/2002 | Walsh |
| 2002/0049535 A1 | 4/2002 | Rigo et al. |
| 2002/0085043 A1 | 7/2002 | Ribak |
| 2002/0087238 A1 | 7/2002 | Matsui |
| 2002/0120925 A1 | 8/2002 | Logan |
| 2002/0138180 A1 | 9/2002 | Hessing et al. |
| 2002/0152027 A1 | 10/2002 | Allen |
| 2002/0152264 A1 | 10/2002 | Yamasaki |
| 2002/0197955 A1 | 12/2002 | Witkowski et al. |
| 2003/0139179 A1 | 7/2003 | Fuchs et al. |
| 2003/0228879 A1 | 12/2003 | Witkowski et al. |
| 2004/0033821 A1 | 2/2004 | Slesak et al. |
| 2004/0048622 A1 | 3/2004 | Witkowski et al. |
| 2004/0089141 A1 | 5/2004 | Georges et al. |
| 2004/0110472 A1 | 6/2004 | Witkowski et al. |
| 2004/0117442 A1 | 6/2004 | Thielen |
| 2004/0203379 A1 | 10/2004 | Witkowski et al. |
| 2005/0090279 A9 | 4/2005 | Witkowski et al. |
| 2005/0155068 A1 | 7/2005 | Chang |
| 2005/0223406 A1 | 10/2005 | Vitito |
| 2005/0235326 A1 | 10/2005 | Vitito |
| 2005/0235327 A1 | 10/2005 | Vitito |
| 2005/0239434 A1 | 10/2005 | Marlowe |
| 2005/0281414 A1 | 12/2005 | Simon et al. |
| 2006/0034481 A1 | 2/2006 | Barzegar et al. |
| 2006/0070102 A1 | 3/2006 | Vitito |
| 2006/0160537 A1 | 7/2006 | Buckley et al. |
| 2006/0168627 A1 | 7/2006 | Zeinstra et al. |
| 2006/0215610 A1 | 9/2006 | Shinoda |
| 2007/0061067 A1 | 3/2007 | Zeinstra et al. |
| 2007/0082706 A1 | 4/2007 | Campbell et al. |
| 2007/0233725 A1 | 10/2007 | Michmerhuizen et al. |
| 2008/0045274 A1 | 2/2008 | Witkowski et al. |
| 2010/0148940 A1 * | 6/2010 | Gelvin et al. ............ 340/286.02 |

FOREIGN PATENT DOCUMENTS

| | | |
|---|---|---|
| DE | 42 23 144 A1 | 1/1995 |
| DE | 196 29 408 A1 | 1/1998 |
| DE | 197 28 083 A1 | 2/1999 |
| DE | 199 17 169 A1 | 11/2000 |
| EP | 0 148 714 A1 | 7/1985 |
| EP | 0 410 698 A2 | 1/1991 |
| EP | 0 592 163 A1 | 4/1994 |
| EP | 0 663 749 A1 | 7/1995 |
| EP | 0 746 129 A2 | 12/1996 |
| EP | 0 751 043 A1 | 1/1997 |
| EP | 0 770 749 A2 | 5/1997 |
| EP | 0 780 992 A1 | 6/1997 |
| EP | 0 821 429 A2 | 1/1998 |
| EP | 0 845 392 A1 | 6/1998 |
| EP | 0 847 899 A1 | 6/1998 |
| EP | 0 904 984 A1 | 3/1999 |
| EP | 0 920 170 A2 | 6/1999 |
| EP | 1 024 626 A1 | 8/2000 |
| EP | 1 043 179 A2 | 10/2000 |
| EP | 1 052 834 A2 | 11/2000 |
| EP | 1 216 900 A1 | 6/2002 |
| GB | 2 264 613 A | 9/1993 |
| GB | 2 279 852 A | 1/1995 |
| GB | 2 296 157 A | 6/1996 |
| JP | 2004-140459 | 5/2004 |
| JP | 2006-501785 | 1/2006 |
| WO | WO 96/32783 A1 | 10/1996 |
| WO | WO 98/04051 A1 | 1/1998 |
| WO | WO 98/25248 A1 | 6/1998 |
| WO | WO 98/53384 A1 | 11/1998 |
| WO | WO 98/53584 A1 | 11/1998 |
| WO | WO 99/03254 A1 | 1/1999 |
| WO | WO 99/05839 A1 | 2/1999 |
| WO | WO 99/30429 A1 | 6/1999 |
| WO | WO 00/51293 A1 | 8/2000 |
| WO | WO 00/72463 A2 | 11/2000 |
| WO | WO 01/82532 A1 | 11/2001 |
| WO | WO 01/86881 A2 | 11/2001 |
| WO | WO 2009/082378 A2 | 7/2009 |

OTHER PUBLICATIONS

U.S. Appl. No. 10/364,794, filed May 26, 2000, Witkowski et al.
U.S. Appl. No. 10/371,802, filed Feb. 21, 2003, Witkowski et al.
U.S. Appl. No. 11/517,946, filed Sep. 8, 2006, Zeinstra et al.
U.S. Appl. No. 11/810,253, filed Jun. 5, 2007, Witkowski et al.
Arfwedson et al., Ericsson's Bluetooth Modules, Ericsson Review, No. 4, 1999, pp. 198-205.
Bennett et al., Piconet: Embedded Mobile Networking, IEEE Personal Communications, Oct. 1997, pp. 8-15.
Briody et al., Intel to Launch Wireless Initiative, Infoworld Media Group, May 18, 1998, 2 pages.
Chinnock, Chris, Car PCs Out for a Test Drive Only, Electronic Buyers' News, Nov. 16, 1998, 3 pages.
Gilroy, Amy, Sony Joins in Music Streaming From Cellphones to Car Audio, printed from website www.twice.com, Aug. 7, 2006, 2 pages.
Haartsen, JAPP, Bluetooth—The Universal Radio Interface for Ad Hoc, Wireless Connectivity, Ericsson Review, No. 3, 1998, pp. 110-117.
Hendy, Jeremy, Ten Points to Ponder Top Ten: The Bluetooth Standard, printed from www.csdmag.com, May 1999, 2 pages.
Jain et al., Standard Boosts Automotive Bluetooth Streaming, Automotive Design Line, printed from website www.automotivedesignline.com, Oct. 3, 2005, 7 pages.
Johnston, Lisa, Anycom Announces Bluetooth Adapter for iPod Nano, Twice: This Week in Consumer Electronics, printed from website www.twice.com, Aug. 7, 2006, 1 page.
Lienert, Anita, Phone Users Will Love New DaimlerChrysler Feature; UConnect, Voice-activated Communication System, Gives Drivers High-tech Convenience, The Detroit News, Aug. 13, 2003, 2 pages.
Ohr, Stephan, Pushes Wireless Standard, Aims for $10 Price Tag: Ericsson's Transceiver Gives Bite to Bluetooth, Electronic Engineering Times, Apr. 19, 1999, 2 pages.
Rothman, Wilson, Just Click 'Decaf'; Get Ready for a Fresh Crop of Cool Gadgets—From Internet Ready Coffee Machines to Portable Video Players, to Dolls Powered by the Latest Robotics, Time Magazine, Sep. 8, 2003, 2 pages.
Seybold, Andrew, Swap: Home RF, Andrew Seybold's Outlook, vol. 16, No. 8, Mar. 31, 1998, 8 pages.
Stajano, Frank, Security for Ubiquitous Computing, John Wiley and Sons, Ltd., Feb. 2, 2002, 23 pages.
Witkowski, Todd, Welcome to the Bluetooth Adapter Site: Technology Overview, Apr. 27, 1999, 9 pages.
2004 Acura TL Long Lead Event—Review of Wave One, Audio/Technology Press, maintained by Zeinstra et al., 2003-2004, 3 pages.
Bluetooth Comes of Age at CEBIT, Incisor: News from the Bluetooth and Short Range RF Environment, Apr. 1999, 7 pages.

Bluetooth Development Kit, http://www.symbionics.co.uk/solutions/bluetooth/bluetoothkit, accessed Mar. 22, 1999, 6 pages.
Bluetooth Development Kit : Frequently Asked Questions, taken from http://symbionics.co.uk/bluetooth/, accessed on Mar. 26, 1999, 2 pages.
Bluetooth—FAQ (Text Only), taken from http://www.bluetooth.com/text/faq/index.asap, printed May 10, 1999, 3 pages.
CH Long Lead Media Comments: TL—Wave 1 and 2 Combined, maintained by Zeinstra et al., 2003-2004, 2 pages.
Comprehensive Description of the Bluetooth System, Jun. 17, 1988, 72 pages.
Feedback from Audio Journalists on Wave 1, maintained by Zeinstra et al., 2003-2004, 3 pages.
International Search Report and Written Opinion for International Patent Application No. PCT/US2004/000088, mailed Jun. 8, 2004, 58 pages.
International Search Report and Written Opinion for International Patent Application No. PCT/US2004/004566, mailed Nov. 30, 2004, 10 pages.
International Search Report for International Patent Application No. PCT/US2000/14692, mailed Mar. 15, 2001, 4 pages.
International Search Report and Written Opinion for International Patent Application No. PCT/US2007/080970, mailed Jul. 20, 2009, 14 pages.
Journalist Comments from Wave II TL Long Lead Event, maintained by Zeinstra et al., 2003-2004, 3 pages.
Microsoft Introduces Auto PC, the Hansen Report on Automotive Electronics, vol. 11, No. 1. Feb. 1998, 8 pages.
New Standard for Wireless Data, Digital Cellular Report, vol. 4, Issue 11, Jun. 4, 1998, 1 page.
Picture of in-dash electronic system, 1998.
Pioneer DEH-P9800BT, CD receiver with MP3/WMA playback and Bluetooth wireless, Crutchfield, printed from website www.crutchfield.com on Nov. 27, 2006, 3 pages.
Sony MEX-BT5000, CD receiver with Bluetooth technology and MP3/WMA playback, Crutchfield, printed from website www.crutchfield.com on Nov. 27, 2006, 2 pages.
Statement regarding technology, 1998, 1 page.
Viking Chips to Rule the Radio Waves, The Australian, Sep. 15, 1998, 3 pages.
Japanese Office Action issued on Nov. 29, 2011 as received in corresponding Japanese Application No. 2009-547232, 2 pages.

* cited by examiner

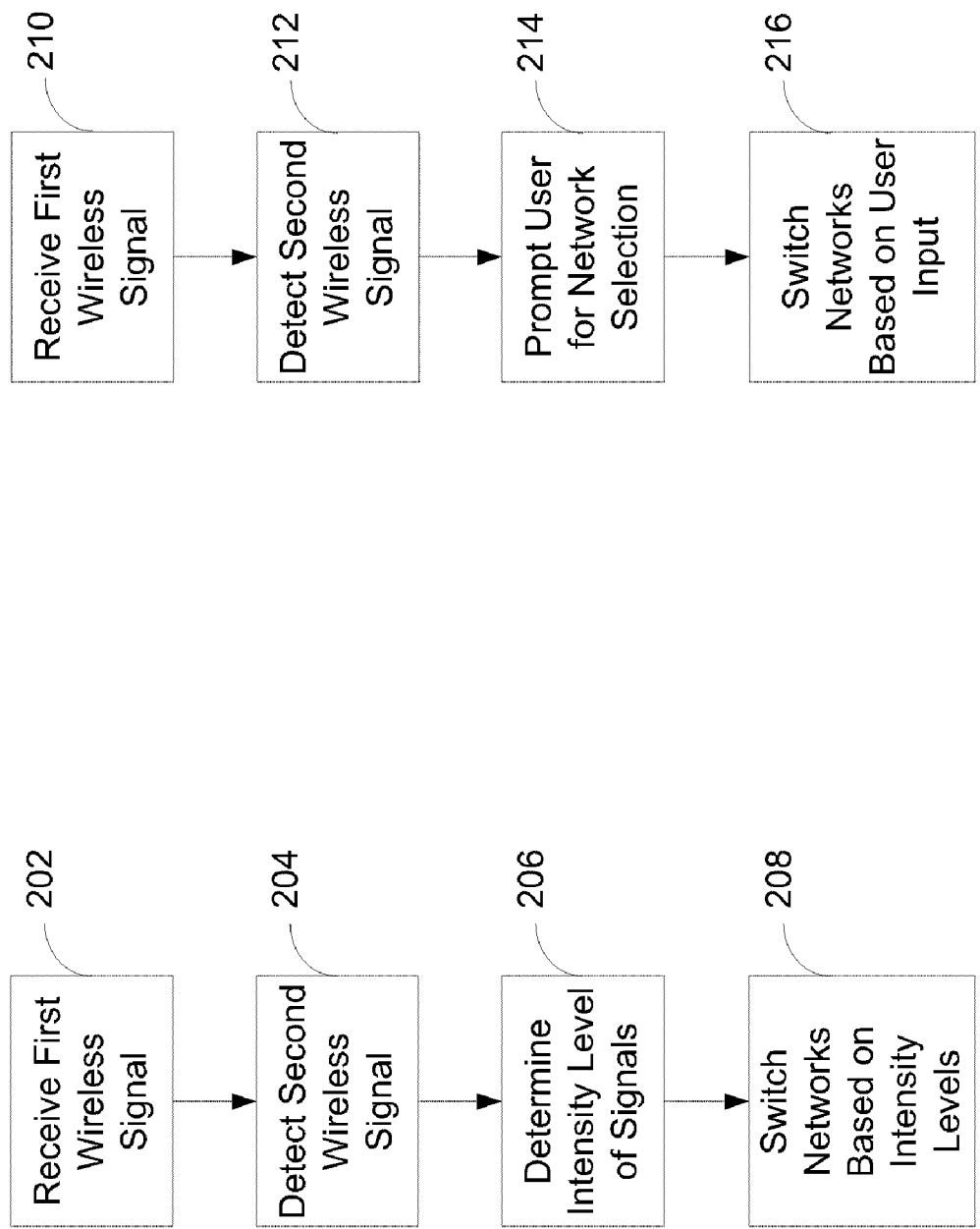

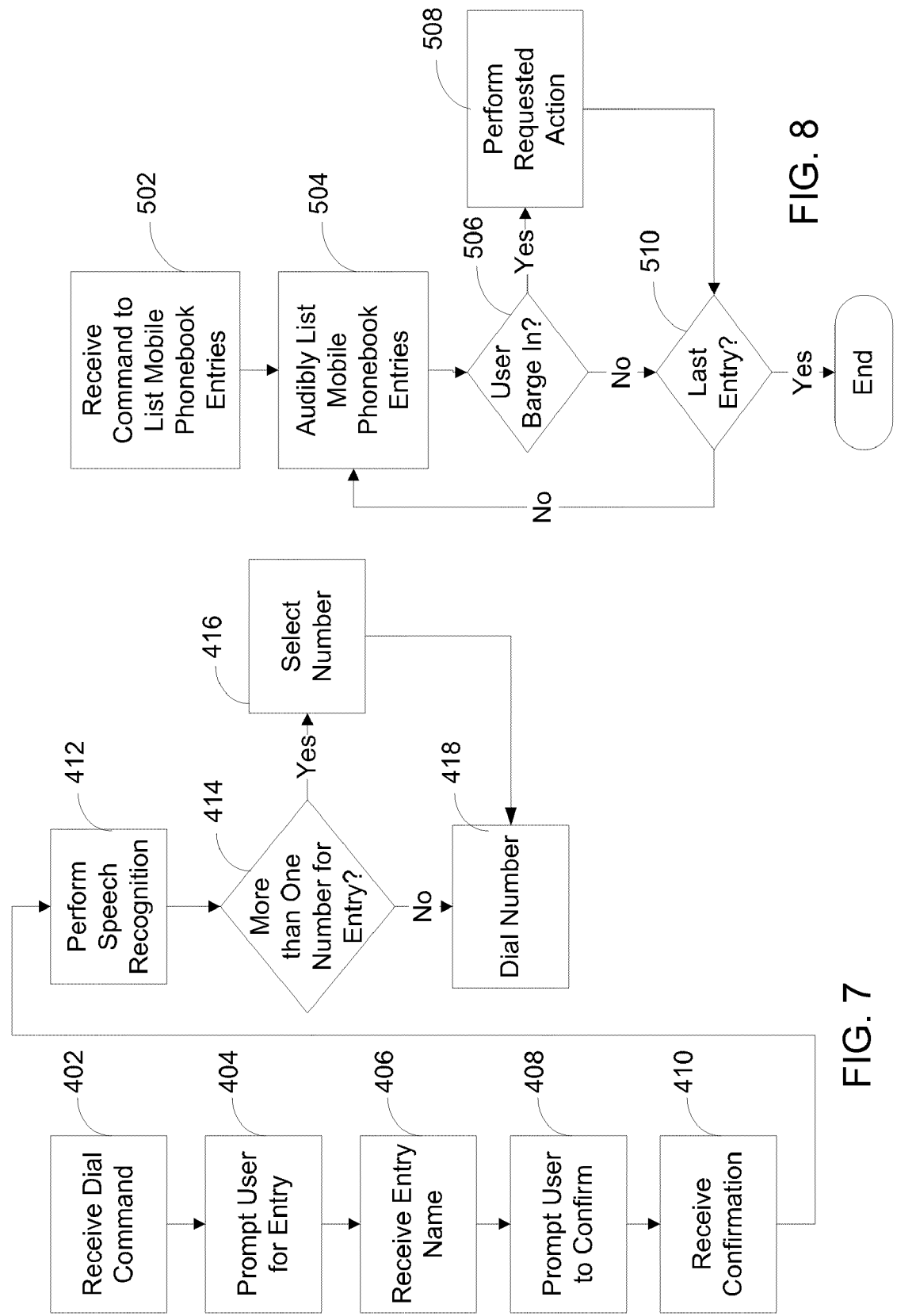

WIRELESS NETWORK SELECTION

CROSS REFERENCE TO RELATED PATENT APPLICATIONS

This application is a continuation of and claims priority to PCT/US2007/080970 titled "Wireless Network Selection" filed on Oct. 10, 2007, which claims Paris Convention priority to U.S. Provisional Application No. 60/851,030 titled "Wireless Network Selection" filed on Oct. 11, 2006 and pending U.S. patent application Ser. No. 11/517,946 titled "System and Method for Using Speech Recognition with a Vehicle Control System" filed on Sep. 8, 2006, which is a continuation-in-part and claims priority to pending U.S. patent application Ser. No. 10/127,982 titled "Wireless Communications System and Method" filed on Apr. 23, 2002, which is a continuation of U.S. patent application Ser. No. 09/979,199, now U.S. Pat. No. 7,257,426, titled "Wireless Communications Systems and Method" filed on May 26, 2000, which is a 35 U.S.C. 371 National Phase Application of PCT/US2000/014692 titled "Wireless Communications System and Method" filed on May 26, 2000, which claims priority to U.S. Provisional Application No. 60/135,979, filed May 26, 1999, and is a continuation-in-part and claims priority to pending U.S. patent application Ser. No. 10/336,466 titled "System and Method for Radio Frequency Communication with a Personal Digital Assistant in a Vehicle" filed on Jan. 3, 2003, which is a continuation-in-part of pending U.S. patent application Ser. No. 09/979,199, now U.S. Pat. No. 7,257,426, titled "Wireless Communications Systems and Method" filed on May 26, 2000, which is a 35 U.S.C. 371 National Phase Application of PCT/US2000/014692 filed on May 26, 2000, which claims priority to U.S. Provisional Application No. 60/135,979, filed May 26, 1999. The disclosures of these applications is hereby incorporated by reference to the extent the subject matter is not included herein and is consistent with this application.

FIELD

The present application relates generally to the fields of data communication in a motor vehicle. More particularly, the application relates to data communication over multiple selectable wireless voice and data networks.

BACKGROUND

Vehicles may include a number of subsystems that may be controlled by a user interface, such as a vehicle center console. Some vehicles may be configured to interface with external devices, such as a mobile phone or other handheld/mobile devices. Such vehicles may also be configured to communicate with mobile devices with a wireless connection, such as using a Bluetooth communications protocol, an IEEE 802.11x communications protocol, an IEEE 802.16 communications protocol, or other wireless communication technology. Some vehicles may be further configured to include speech recognition capabilities, as such capabilities relate to vehicle navigation. However, it is noted that it would be advantageous to have a central vehicle control system that facilitates accessing and/or controlling handheld devices, such as a mobile phone, over a communication link. It is noted that it would also be advantageous to have a central vehicle control system that facilitates use of a mobile phone by roaming between available wireless communication networks to provide voice and data communication.

SUMMARY

One embodiment relates to an in-vehicle communication system configured to roam between a plurality of wireless communication networks, including a mobile telephony network and an internet protocol network. The system includes a wireless transceiver module configured to receive a wireless communication signal transmitted from the plurality of wireless communication networks. The system further includes a control logic circuit configured to measure an intensity of the wireless communication signal. The system further includes a switching module configured to facilitate roaming between the plurality of wireless communication networks based on the intensity of the wireless communication signal measured by the control logic circuit.

Another embodiment relates to a method of connecting an in-vehicle communication system to a plurality of wireless communication networks, including a mobile telephony network and an internet protocol network. The in-vehicle communication system is configured to roam between the plurality of wireless communication networks. The method includes the step of receiving a first wireless communication signal from one of the plurality of wireless communication networks. The method further includes the step of detecting a second wireless communication signal from a second of the plurality of wireless communication networks. The method also includes the step of determining an intensity level of the first and second wireless communication signals. The method further includes the step of switching the in-vehicle communication system to one of the plurality of wireless communication networks based on the intensity level of the first and second wireless communication signals.

Another embodiment relates to an in-vehicle communication system configured to roam between a cellular telephony network and a wireless internet protocol network. The system includes a wireless transceiver module configured to transmit to and receive a wireless communication signal transmitted from the plurality of wireless communication networks. The system also includes a control logic circuit configured to measure an intensity of the wireless communication signal. The system also includes a switching module configured to facilitate roaming between a cellular telephony network and a wireless internet protocol network based on the intensity of the wireless communication signal measured by the control logic circuit. The system also includes a location determining system configured to provide vehicle location information, and is further configured to facilitate locating at least one of the cellular telephony network or the wireless internet protocol network.

BRIEF DESCRIPTION OF THE DRAWINGS

FIG. 5 is a process flow diagram illustrating a method of automatically connecting the in-vehicle communication system of FIG. 3 to a plurality of wireless communication networks, according to one exemplary embodiment;

FIG. 6 is a process flow diagram illustrating a method of connecting the in-vehicle communication system of FIG. 3 to a plurality of wireless communication networks based on user input, according to one exemplary embodiment;

FIG. 7 is a process flow diagram illustrating a method of receiving a request from a user to access a phonebook entry including an associated phonemic representation using speech recognition with the in-vehicle communication system of FIG. 3, according to one exemplary embodiment;

FIG. 8 is a process flow diagram illustrating a method of listing phonebook entries to a user with the in-vehicle communication system of FIG. 3, according to one exemplary embodiment;

DETAILED DESCRIPTION OF THE EXEMPLARY EMBODIMENTS

Figure 1:
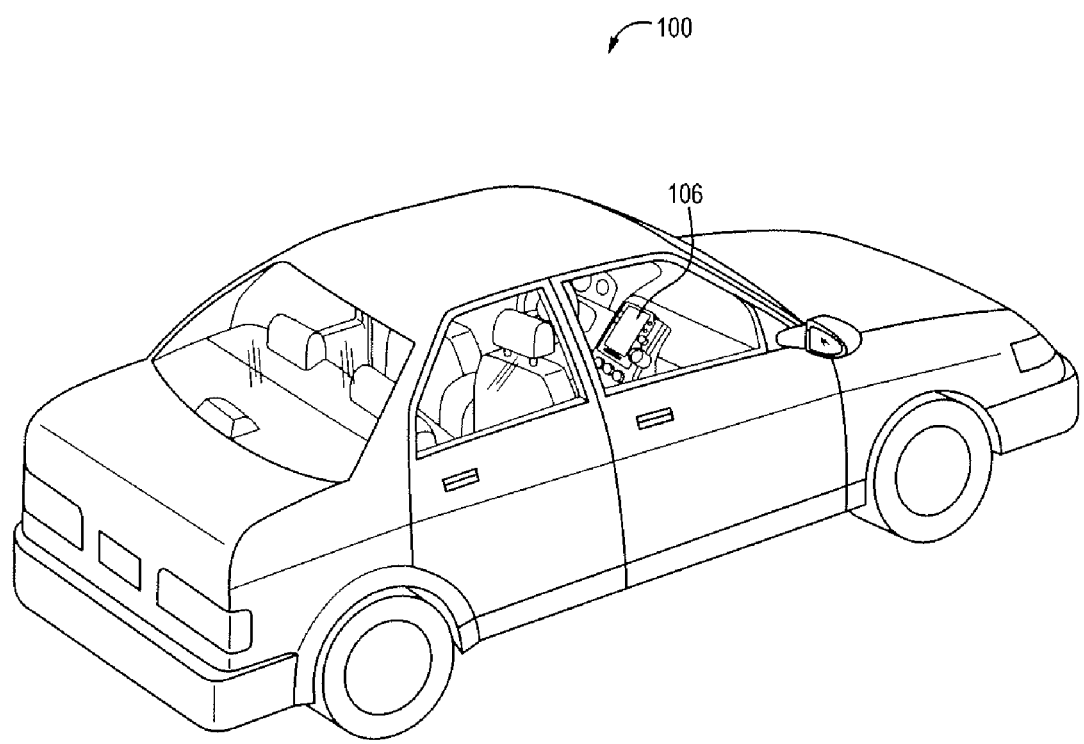
FIG. 1 is a perspective view of a motor vehicle that includes a number of vehicle systems, including an in-vehicle communication system, according to one exemplary embodiment.

Referring to FIG. 1, a vehicle 100 includes a number of subsystems for user convenience. Vehicle 100 generally includes a heating, ventilation, and air-conditioning (HVAC) system, an audio system, and an in-vehicle communication system 106. The HVAC system and audio system may be coupled to in-vehicle communication system 106, which is capable of controlling and monitoring both systems, automatically or by a manual user command. It is noted that in various exemplary embodiments: vehicle 100, the HVAC system, and the audio system may be of any past, present, or future design that is capable of housing (in the case of vehicle 100) and interacting with in-vehicle communication system 106.

Figure 2:
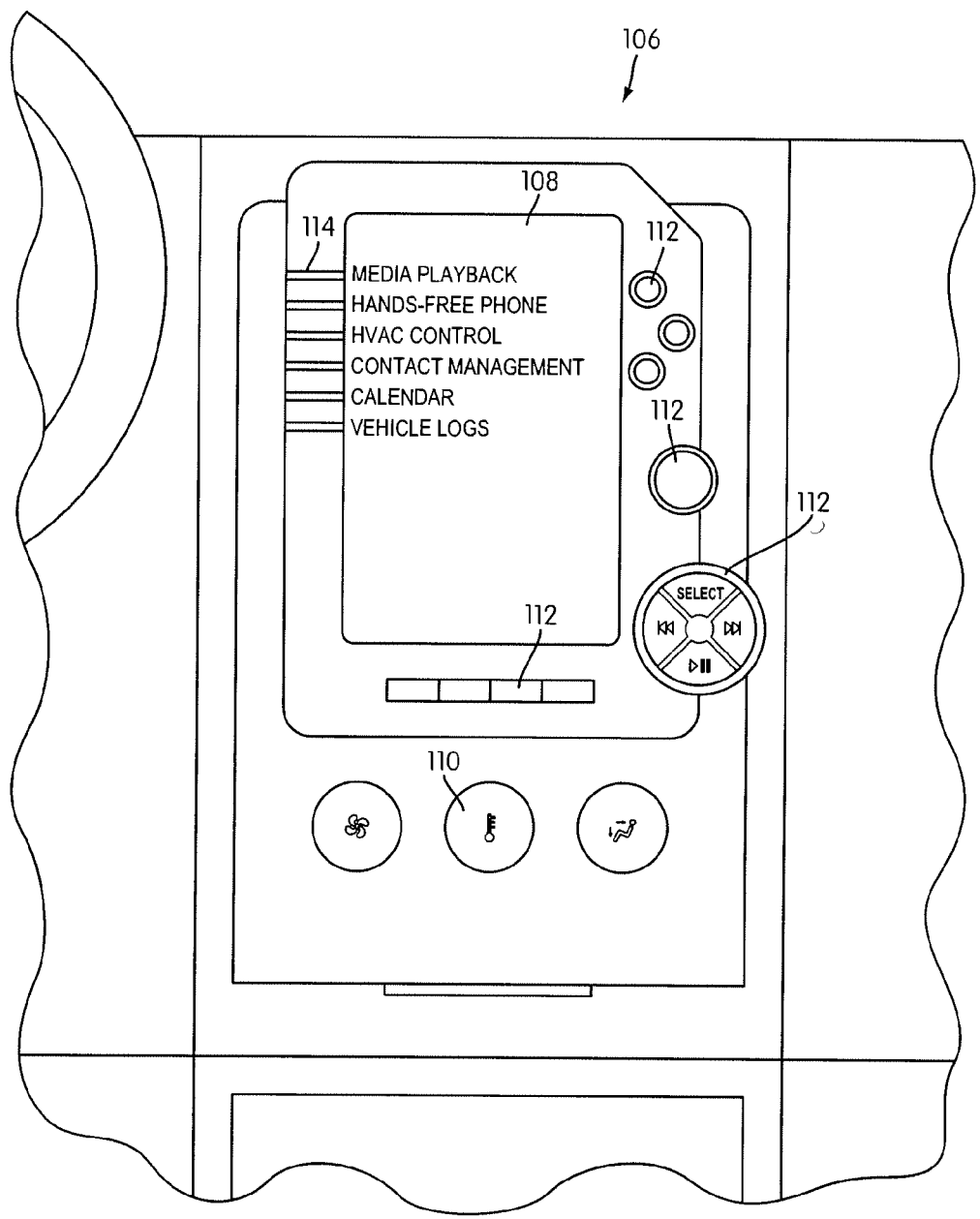
FIG. 2 is a front view of the user interface of the in-vehicle communication system of FIG. 1, according to one exemplary embodiment.

Referring to FIG. 2, one exemplary embodiment of in-vehicle communication system 106 is shown. In-vehicle communication system 106 generally includes an output display 108, one or more knobs 110, one or more pushbuttons 112, and one or more tactile user inputs or pushbuttons 114, which facilitate controlling various vehicle functions. Output display 108 may be configured to display data related to the control of the vehicle functions. In one exemplary embodiment, output display 108 may be a touch-screen display, while in other exemplary embodiments, may be any other non-touch sensitive display. In still other exemplary embodiments, output display 108 may be of any technology (e.g. LCD, DLP, plasma, CRT), configuration (e.g. portrait or landscape), or shape (e.g. polygonal, curved, curvilinear). Knobs 110 and pushbuttons 112 and 114 may be configured: (i) to control functions of the HVAC system such as fan speed, cabin temperature, or routing of air flow, (ii) to control playback of media files over the audio system, (iii) to control retrieval of phonebook entries, or (iv) to control any other desired vehicle function. Pushbuttons 114 typically allow for the selection and display of various functions of in-vehicle communication system 106 including HVAC system control, audio system control, hands-free phone use, contact or address/phone book management, calendar viewing/modification, and vehicle data logging. The operation of pushbutton 114 for media playback may display a media playback menu screen or execute commands that allow the user to view, select, sort, search for, and/or play audio or video files by tactile or oral command. The operation of pushbutton 114 for hands-free phone operation may display a menu screen or execute commands that allows the user to connect in-vehicle communication system 106 to a mobile phone so that speaking into the vehicle console of in-vehicle communication system 106 operates the mobile phone. The operation of pushbutton 114 for HVAC control may display a menu screen or execute commands that allow the user to control cabin temperature and air flow by tactile or oral command. The operation of pushbutton 114 for contact management may display a menu screen or execute commands that allow the user to view, list, select, sort, search for, edit and/or dial one or more entries containing personal contact information, by use of a tactile or oral command. The operation of pushbutton 114 for calendar management may display a menu screen or execute commands that allow the user to view, list, select, sort, search for, edit and/or create one or more entries containing personal schedule information by tactile or oral command. The operation of pushbutton 114 for vehicle log management may display a menu screen or execute commands that allow the user to input, view, select and/or reset information related to vehicle operation (e.g. fuel economy, engine temperature, distance to empty, etc.) by tactile or oral command. Pushbutton 114 may be configured to be a virtual pushbutton implemented via a display and touchscreen.

Figure 3:
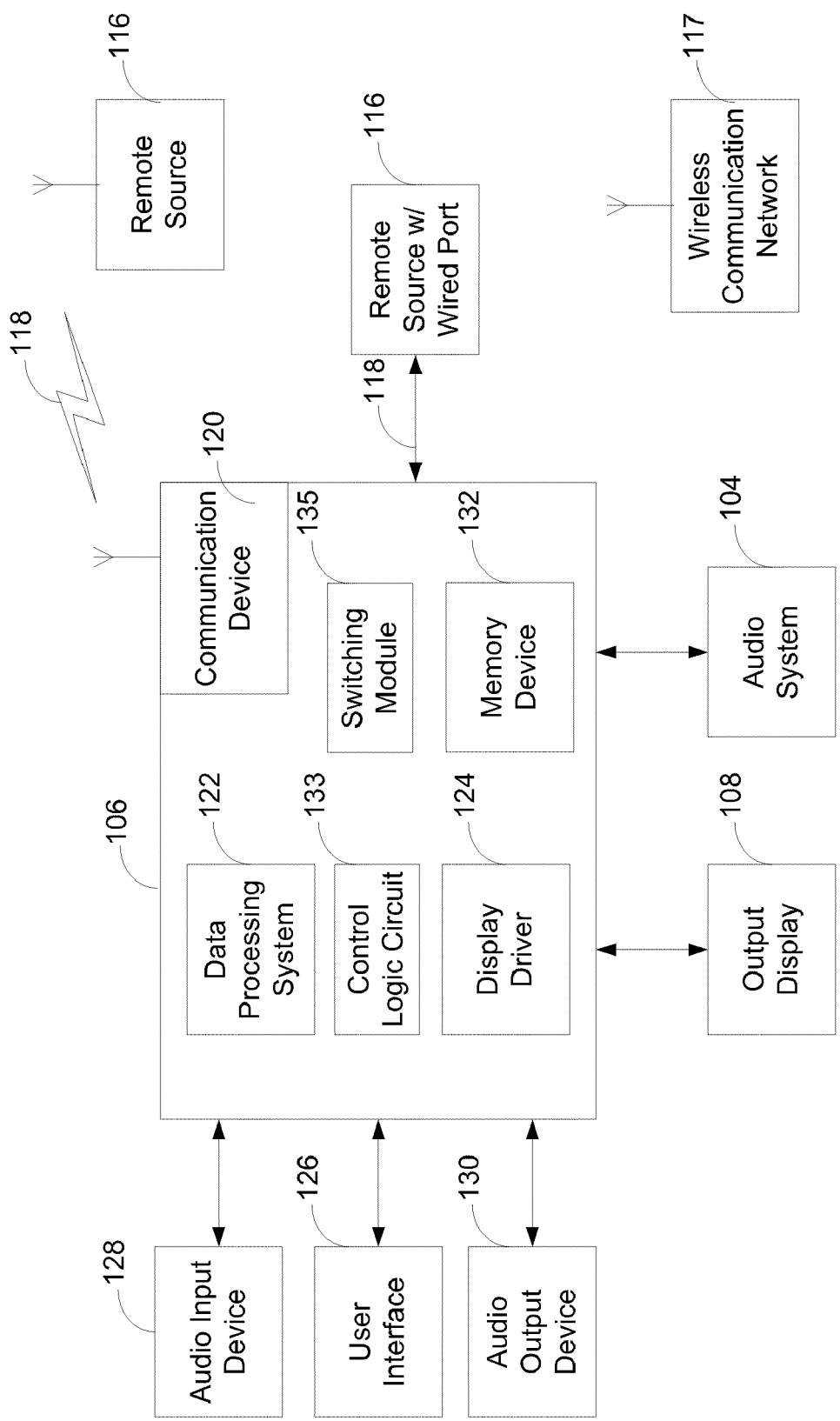
FIG. 3 is a block diagram of the in-vehicle communication system of FIG. 1 that includes a speech recognition system, according to one exemplary embodiment.

FIG. 3 is a block diagram of in-vehicle communication system 106 in vehicle 100 configured to roam between multiple wireless communication networks in accordance with an exemplary embodiment. In-vehicle communication system 106 enables a vehicle occupant, such as a driver, to vocally communicate over a wireless network 117, for example using occupant's mobile phone, and based on conditions of wireless network 117, may automatically switch to another wireless network 117 to facilitate the vocal communication. Alternatively, the user may manually switch between networks that are available. It should be understood that although a system for switching between wireless networks 117 will be described in detail herein with reference to mobile phone 116, one or more of the systems and methods for switching between wireless networks 117 may be applied to, and find utility in, other types of communication devices as well. For example, one or more of the systems for switching wireless networks may be suitable for use with a personal digital assistant (PDA), a pager, etc., all of which may require certain device-specific hardware and software to facilitate wireless network switching.

The exemplary system shown in FIG. 3 enables a wireless and/or wired communication link 118 to be established between in-vehicle communication system 106 of vehicle 100 and mobile phone 116 (e.g., a mobile phone with a Bluetooth-enabled connection) of a vehicle occupant. The wired connection may include a cradle for mobile phone 116 or a similar wired adapter, such as an analog audio input/output connection (e.g., a microphone or headphone jack). The following description refers to an exemplary communication system using a wireless communication link between in-vehicle communication system 106 and mobile phone 116 of a vehicle occupant, however, it should be understood that methods and systems for switching between wireless networks 117 used by mobile phone 116 described herein may be used in conjunction with other configurations of communication systems, such as a wired connection to mobile phone 116, etc.

In FIG. 3, in-vehicle communication system 106 is coupled to audio system 104. In an alternative embodiment, in-vehicle communication system 106 may be incorporated into audio system 104. Communication device 120, for example a wireless transceiver, of in-vehicle communication system 106, enables two-way communication with mobile phone 116. Communication device 120 may be configured as a communication circuit including analog and/or digital components, such that communications device 120 is capable of transmitting and receiving short-range radio frequency ("RF") signals in any of a variety of data transmission formats, such as a Bluetooth communications protocol, an IEEE 802.11 communications protocol, an IEEE 802.16 communication protocol, or other personal area network wireless communications protocols or data formats. Mobile phone 116 may include a plurality of communication modules, for example, a Bluetooth communication module configured to communicate with communications device 120.

In-vehicle communication system 106 is also coupled to a user interface 126 and an audio input device 128. Audio input device 128 may be a wired or wireless device. User interface 126 may be used to receive input commands from a vehicle occupant via, for example, pushbuttons, switches, a keypad, a touch screen display, etc. Alternatively, input commands to in-vehicle communication system 106 may include a set of audio signals from a vehicle occupant. For example, a vehicle occupant may speak directly into audio input device 128 to provide input commands to in-vehicle communication system 106. Audio input device 128 may include one or more audio input devices configured to receive an oral command from a vehicle occupant. The oral command may be any word or phrase that the occupant may speak, utter, or otherwise provide to cause the communication system or another system to perform a function. A data processing system 122 in in-vehicle communication system 106 may be used to process various data signals, such as audio signals (e.g., oral input commands or user utterances) received via audio input device 128 and to recognize words or phrases in the oral command. Voice recognition technologies known in the art may be implemented in data processing system 122. For example, data processing system 122 may comprise any speech recognition software or engine such as IBM Embedded ViaVoice®, manufactured by International Business Machines Corporation.

In-vehicle communication system 106 may also be coupled to an output display 108. Output display 108 may comprise a small cathode ray tube (CRT), liquid crystal display (LCD), or various other types of visual displays which are easily visible in various lighting conditions. In-vehicle communication system 106 may comprise one or more analog and/or digital electrical or electronic components, and may include a microprocessor, a microcontroller, application-specific integrated circuit (ASIC), programmable logic and/or other analog and/or digital circuit elements configured to perform various input/output, control, analysis and other functions described herein. In-vehicle communication system 106 may also include a memory device 132, including volatile and non-volatile memory in order to, for example, store a computer program, other software, or a data file to perform the functions described herein. Each element in vehicle 100 shown in FIG. 3 may be mounted in or coupled to the same or different interior vehicle elements such as a dashboard, an overhead console, an instrument panel, a visor, a rearview mirror, or other appropriate locations within the vehicle. User interface 126, audio input device 128 and output display 108 are mounted in a location convenient to the vehicle occupants, in particular, the driver, according to an exemplary embodiment.

Audio system 104 may include, for example, a radio, an amplifier and at least one audio output device configured to provide audio signals to one or more vehicle occupants. The audio output devices (not shown) are configured to receive audio output data from in-vehicle communication system 106 and/or other systems (e.g., a digital audio file from a mobile phone, information prompts or other messages provided by in-vehicle communication system 106, etc.). The audio output devices may be a part of vehicle audio system 104 or may be a dedicated audio output device or audio output devices 130 serving only in-vehicle communication system 106. Audio output devices 130 may be a wired or wireless device.

As mentioned above, in the exemplary system shown in FIG. 3, in-vehicle communication system 106 is linked via a wireless communications link with a mobile phone 116 of a vehicle occupant. A communication link may be established with different mobile phones as different occupants are enabled to use in-vehicle communication system 106. A communication link may be established, for example, in response to a command received from the user via user interface 126 or an oral command received via audio input device 128. The wireless communication link operates in accordance with a wireless communication standard, such as Bluetooth communication protocol, IEEE 802.11 communication protocol, IEEE 802.16 communication protocol, or other appropriate wireless communication standards. Accordingly, mobile phone 116 is enabled to operate in accordance with or to communicate with the wireless communications standard used for the wireless communication link.

The communication link between in-vehicle communication system 106 and mobile phone 116 enables usage of mobile phone 116 via in-vehicle communication system 106. Subsequently, vocal communication using mobile phone 116 is controlled from user interface 126 or audio input device 128. For example, after a communication link is established between mobile phone 116 and in-vehicle communication system 106, the process of switching between wireless networks 117 may begin upon establishing the communication link or as a result of a command by a user. The user may provide the command via inputting the command into the user interface 126 or spoken commands into audio input device 128. For example, a phone number may be dialed and a conversation held through in-vehicle communication system 106 by receiving an oral command from a vehicle occupant and sending the dial command to mobile phone 116 via wireless communication link 118. Audio information received by in-vehicle communication system 106 may be provided to the user via audio system 104 (e.g., via audio output devices, not shown) and data retrieved from mobile phone 116 may be displayed on output display 108. Mobile phone 116 may be located anywhere within the proximity of vehicle 100, such as in an occupant's pocket or briefcase, in the trunk or within a range of communication with communications device 120.

In-vehicle communication system 106 also includes a control logic circuit 133 and a switching module 135 to facilitate communication with each wireless communication network 117. In various exemplary embodiments, wireless communication network 117 may be a mobile telephony network (e.g. a cellular network), an internet protocol network, a satellite communication network, or any communication network capable of wireless transmission. Examples of internet protocol networks include voice-over-internet-protocol (VoIP), IEEE 802.11 wireless fidelity (WiFi), WiFi based VoIP (Vo-WiFi), etc. For purposes of this disclosure, a "communication network" includes a telephone network (e.g. cell phone network) or an information/data/voice transmission network (e.g. the Internet).

Communication device 120 is configured to send and receive data to and from each wireless communication network 117. Communication device 120 receives instructions for data communication with wireless networks 117 from control logic circuit 133 and switching module 135. In various exemplary embodiments, Communication device 120 may be of any past, present, or future design that is capable of wireless communication. In one exemplary embodiment, Communication device 120 may include multiple transceiver modules that each communicate with a specific type of wireless communication networks. In another exemplary embodiment, communication device 120 may include a transceiver module that is capable of communication with multiple types of wireless communication networks.

Control logic circuit 133 is configured to measure an intensity level of wireless communication signals sent from each wireless communication network 117. For purposes of this disclosure, the term "intensity level" includes various meanings including a rate of data transmission, a speed of a network connection, a number of cellular signal transmission towers in a given area, a number of access points in a given area, a number of satellites communicable in a given area, the signal strength from a communication network (e.g. signal strength of a mobile telephony network or the Internet), or voice/data transmission quality. In another embodiment, intensity level may be interpreted to mean the longest uninterrupted connection time. In yet another embodiment, intensity level may be interpreted based on a programmed cost structure, such that the system 106 selects the least expensive network connection, wherein the selected network has sufficient signal strength to complete a voice or data transmission. Control logic circuit 133 may quantify any one or more of these intensity levels for transmission to switching module 135.

Switching module 135 is typically configured to facilitate roaming or switching between multiple wireless communication networks 117 based on the intensity level of each corresponding wireless communication signal measured by control logic circuit 133. If the desired wireless communication network is unavailable, then transmission may continue on the current wireless communication network. In an alternative embodiment, switching module 135 may switch wireless communication networks based on user input. For example, in-vehicle communication system 106 may prompt the user to select an available network, which may be displayed on output display 108 or listed orally on audio system 104 or audio output device 130. The user input may be entered either by oral command or by use of user interface 126. In one exemplary embodiment, switching module 135 may roam from one type of wireless communication network to a different type of wireless communication network. For example, switching module 135 may roam from a mobile telephony network such as a cellular network to an internet protocol network such as a VoIP network. In other examples, switching module 135 may roam between any other types of wireless communication networks. In another exemplary embodiment, switching module 135 may roam between multiple wireless communication networks of the same type. For example, switching module 135 may roam between multiple cellular networks. In other examples, switching module 135 may roam between multiple satellite networks, VoIP networks, WiFi networks, VoWiFi networks, or any other wireless communication network types.

Figure 4:
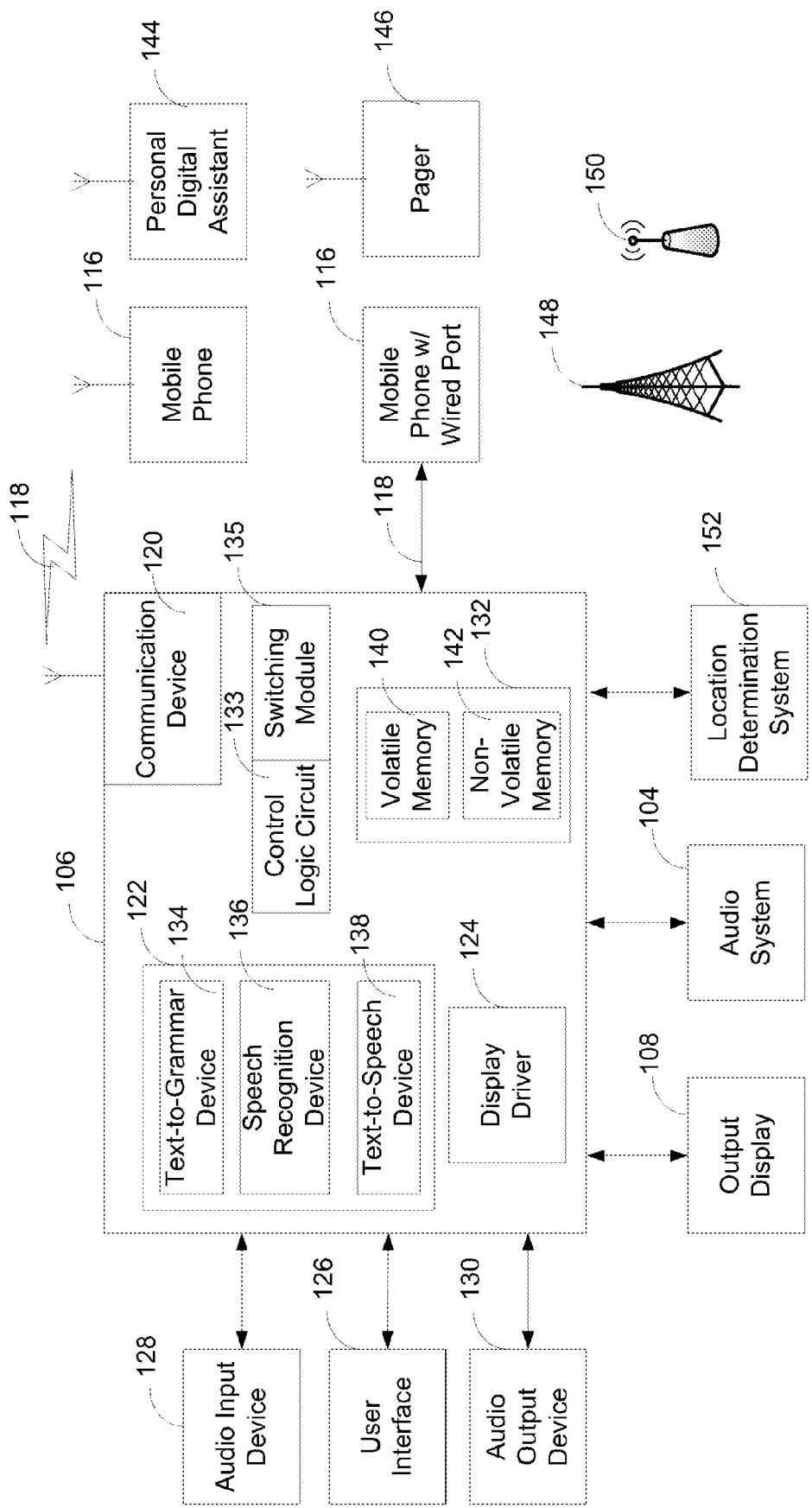
FIG. 4 is a more detailed block diagram of the in-vehicle communication system of FIG. 3, according to one exemplary embodiment.

FIG. 4 is a block diagram of a communication system for switching wireless communication networks used by mobile phone 116 in vehicle 100 including in-vehicle communication system 106 of FIG. 3. Memory device 132 includes volatile memory 140 and non-volatile memory 142 for storing computer or software programs to perform functions of in-vehicle communication system 106. For example, memory device 132 includes a predetermined vocabulary of command words that may be recognized by speech recognition device 136 of data processing system 122. The predetermined vocabulary may be used to manipulate systems and applications in the vehicle, in order to perform a function. Speech recognition device 136 is configured to recognize words or phrases in an oral command and to compare the recognized word to the predetermined vocabulary of command words, in order to determine an appropriate action and/or the appropriate system or application to which an instruction should be delivered. Data processing system 122 also includes a text-to-speech device 138 and a text-to-grammar device 134. Text-to-speech device 138 is configured to convert text (e.g., ASCII text) to an audio representation (e.g., PCM) that may be played through audio output devices 126 or audio system 104. Text-to-grammar device 134 is configured to convert text (e.g., ASCII text) to a phonemic representation that may be used by speech recognition device 136 to recognize words or text in an oral command from a user. Text-to-speech device 138 and text-to-grammar device 134 may be part of the same application or different applications. Text-to-speech and text-to-grammar technologies known in the art may be used such as Embedded ViaVoice® Text-To-Speech engine and Text-to-grammar device, manufactured by International Business Machines Corporation.

Note that in addition to or in replacement of mobile phone 116, other devices such as a personal data assistant 144, a pager 146, or any other devices capable of vocal transmission that include a transceiver and are able to interface with in-vehicle communication system 106 over communications link 118, in either a wireless or wired embodiment may be used.

In the illustrated exemplary embodiment, in-vehicle communication system 106 may switch or roam among a mobile telephony network 148 and an internet protocol network 150. When switching module 135 receives a measured intensity level from control logic circuit 133 for each network (148 and 150), it may switch to the network that has the preferable intensity level. For example, switching module 135 may switch to the network with the greater number of cellular transmission antennas or wireless access points in a region. The region or location of vehicle 100 may be given by a location determination system 152 (e.g., a global positioning system) that is coupled to in-vehicle control system 106. In one exemplary embodiment location determination system 152 may be a global positioning system, while in another exemplary embodiment, location determination system 152 may calculate or receive the vehicle location based on information received from mobile telephony network 148 (e.g. as with the GSM cellular protocol). In still other exemplary embodiments, location determination system may be a compass, a gyroscope, or any other device capable of being used for determining a position. In another exemplary embodiment, location determination system 152 may be integrated into in-vehicle control system 106 or other portion of vehicle 100 while in still another exemplary embodiment, location determination system 152 may be integrated into mobile phone 116, PDA 144, or pager 146.

Referring to FIG. 5, a method is illustrated for connecting in-vehicle communication system 106 to multiple wireless communication networks 117, for example mobile telephony network 148 and internet protocol network 150, and automatically switching or roaming between the plurality of networks.

Communication device 120 of in-vehicle communication system 106 is configured to receive a first wireless communication signal from one of wireless communication networks 117, for example mobile telephony network 148 (step 202).

Communication device 120 of in-vehicle communication system 106 is configured to detect a second wireless communication signal from a second of network of wireless communication networks 117, for example internet protocol network 150 (step 204).

Control logic circuit 133 determines the intensity level of the first and second wireless communication signals (step 206). As noted above, the intensity level may include quantifications of: a rate of data transmission, a speed of a network connection, a number of cellular signal transmission towers in a given area, a number of access points in a given area, a number of satellites communicable in a given area, the signal strength from a communication network (e.g. signal strength of a mobile telephony network or the Internet), voice/data transmission quality, or any combination thereof.

Switching module 135 switches in-vehicle communication system 106 to one of wireless communication networks 117, for example mobile telephony network 148 or internet protocol network 150, based on the intensity level of the first and second wireless communication signals (step 208). As mentioned above, this switching is typically performed based on what switching module 135 determines to be a preferable intensity level, for example a stronger signal strength or greater number of antennas or access point in a given region.

It is noted that while the above exemplary embodiment discusses automatic selection between two wireless communication networks, according to other exemplary embodiments, the method may detect and choose between more than two wireless communication networks.

Referring to FIG. 6, a method is illustrated for connecting in-vehicle communication system 106 to multiple wireless communication networks 117, for example mobile telephony network 148 and internet protocol network 150, and switching or roaming between the networks based on a user input.

Communication device 120 of in-vehicle communication system 106 is configured to detect a second wireless communication signal from a second of network of wireless communication networks 117, for example internet protocol network 150 (step 210).

Communication device 120 of in-vehicle communication system 106 is configured to detect a second wireless communication signal from a second of network of wireless communication networks 117, for example internet protocol network 150 (step 212).

In-vehicle communication system 106 is configured to prompt the user to select an available wireless communication network (step 214). According to various exemplary embodiments, the available wireless communications networks may be displayed on output display 108 or listed audibly over audio system 104 or audio output device 130 and the user may select the desired network via an oral command or by using user interface 126 (e.g. using pushbuttons or knobs). According to another exemplary embodiment, the intensity levels of the signals may be displayed on output display 108 or recited on audio system 104 or audio output device 130 for each available network in order to aid the user in selection of a network.

Switching module 135 is configured to switch in-vehicle communication system to one of wireless communication networks 117, for example mobile telephony network 148 or internet protocol network 150, based on the user selection, as shown in step 216.

It is noted that while the above exemplary embodiment discusses manual selection between two wireless communication networks, according to other exemplary embodiments, the method may detect and choose between more than two wireless communication networks.

Referring to FIG. 7, a method for speech-enabled dialing using a mobile phonebook is illustrated according to one exemplary embodiment. In-vehicle communication system 106 will automatically dial a number on a hands-free phone set using speech recognition of user commands.

In-vehicle communication system 106 is configured to receive a command to initiate a phone call from a user via audio input device 128 (step 402).

In-vehicle communication system 106 is configured to prompt the user to provide an entry name (step 404). The prompt may be played via audio output device 130 or the audio system.

In-vehicle communication system 106 is configured so that the user may provide the entry name with an oral command to initiate a call (e.g., "call <entry name>") (step 406).

In-vehicle communication system 106 is configured to prompt the user to confirm the entry provided at step 406 (step 408).

In-vehicle communication system 106 is capable of receiving oral confirmation or confirmation via user interface 126 (e.g., a button or switch) from the user that the correct entry was provided (step 410).

If confirmation was received at step 410, speech recognition device 136 compares the command with the mobile phonebook entries and system phonebook entries and identifies the desired mobile phonebook entry (step 412). If there are similar entries in the system phonebook and the mobile phonebook, the speech recognition device may select the best match.

The speech recognition device determines if there is more than one number associate with the desired entry (e.g., the entry includes a home number and a work number) (step 414). In the event that there is more than one number associated with the entry, in-vehicle communication system 106 may list the numbers in the entry via an audible prompt on audio output device 130 or via a visual prompt on output display 108. In an exemplary embodiment where an audible prompt is given, text-to-speech device 138 may be used to convert the numbers to audio output.

In-vehicle communication system 106 is configured so that the user may select the appropriate number via an oral command or user interface 126 (e.g., a button or switch) (step 416).

Once a number has been determined, in-vehicle communication system 106 is configured to send the phone number to mobile phone 116 via communications link 118 and the number is dialed (step 418).

Referring to FIG. 8, in-vehicle communication system 106 is also configured to provide a user with a listing of the mobile phonebook entries upon request. A method for audibly listing phone entries of a mobile phonebook in accordance with one exemplary embodiment is illustrated.

In-vehicle communication system 106 is configured to receive an oral command from the user via an audio input device 128 to list the contents of the mobile phonebook (step 502).

In response to the oral command, in-vehicle communication system 106 is configured to play the text of each entry (step 504). The text (e.g., name text) of each entry is converted to an audio representation using text-to-speech device 138 and the audio may be played in the vehicle over audio output device 130 or the audio system. The text of the entries is also shown on output display 108 in alphanumeric order sorted character by character. A predetermined time period elapses between the playing of each entry and in-vehicle communication system 106.

In-vehicle communication system 106 is configured to allow the user to interrupt the audible listing of the phonebook entries by permitting the user to "barge-in," as in step 506. A user may barge in during the playing of an entry text or during a predetermined time after the playing of the entry in order to execute a command given orally to audio input device 128 or via user interface 126 (e.g., a button or switch).

If the user provides a command and "barges in," in-vehicle communication system 106 is configured to recognize the command and perform the requested action, as in step 508. For example, a user may provide a command to skip to the next entry or to skip to an entry beginning at the next alphanumeric character. A user may also provide commands to select a desired entry once it is heard or to repeat a previous entry. If an entry is selected, a user may then, for example, initiate a call or transfer the entry to the system phonebook.

In-vehicle communication system 106 is configured to determine whether the last entry has been reached or if an entry has been selected (step 510). If the last entry has been reached or if an entry has been selected, in-vehicle communication system 106 ends the method. If the last entry has not been reached, the method returns to step 504 and continues until either an entry is selected or the last entry in the mobile phonebook is reached.

It should be understood that these embodiments are offered by way of example only. Accordingly, the present disclosure is not limited to a particular embodiment, but extends to various modifications that nevertheless fall within the scope of the appended claims. The order or sequence of any processes or method steps may be varied or re-sequenced according to alternative embodiments.

Describing the disclosure with figures should not be construed as imposing on the disclosure any limitations that may be present in the figures. The present disclosure contemplates methods, systems and program products on any machine-readable media for accomplishing its operations. The embodiments of the present disclosure may be implemented using an existing computer processors, or by a special purpose computer processor for an appropriate vehicle system, incorporated for this or another purpose or by a hardwired system.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software implementations of the present disclosure could be accomplished with standard programming techniques with rule based logic and other logic to accomplish the various connection steps, processing steps, comparison steps and decision steps.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated

What is claimed is:

1. An in-vehicle communication system configured to roam between a plurality of wireless communication networks, including a mobile telephony network and an internet protocol network, the system comprising:
    a wireless transceiver module configured to receive a wireless communication signal transmitted from the plurality of wireless communication networks;
    a control circuit configured to measure an intensity of the wireless communication signal; and
    a switching module configured to facilitate roaming between the plurality of wireless communication networks based on the intensity of the wireless communication signal measured by the control circuit.

2. The in-vehicle communication system of claim 1, wherein the roaming between the plurality of wireless communication networks is performed in response to the control logic circuit measuring a change in the intensity of the wireless communication signal.

3. The in-vehicle communication system of claim 1, wherein the roaming between the plurality of wireless communication networks is performed in response to the wireless transceiver module detecting a second wireless communication signal, the signal being originated from a second wireless communication network.

4. The in-vehicle communication system of claim 1, wherein the mobile telephony network comprises a communication network for transmitting a cellular telephony and/or data signal.

5. The in-vehicle communication system of claim 1, further comprising a user interface for receiving an input command from a user.

6. The in-vehicle communication system of claim 1, wherein the roaming between the plurality of wireless communication networks is performed in response to input by a user.

7. The in-vehicle communication system of claim 6, wherein the input by the user is a spoken command.

8. The in-vehicle communication system of claim 1, wherein the in-vehicle communication system is coupled to a location determining system configured to provide vehicle location information.

9. The in-vehicle communication system of claim 8, wherein the location determining system is a global positioning system.

10. The in-vehicle communication system of claim 8, wherein the location determining system is configured to facilitate locating at least one of the plurality of wireless communication networks.

11. A method of connecting an in-vehicle communication system to a plurality of wireless communication networks, including a mobile telephony network and an internet protocol network, the in-vehicle communication system being configured to roam between the plurality of wireless communication networks, the steps of the method comprising:
- receiving, at a transceiver of an in-vehicle communications system, a first wireless communication signal from one of the plurality of wireless communication networks;
- receiving, at the transceiver of the in-vehicle communications system, a second wireless communication signal from a second of the plurality of wireless communication networks;
- using a control logic circuit coupled to the transceiver to determine an intensity level of the first and second wireless communication signals; and
- using the control logic circuit to cause a switching of the in-vehicle communication system to one of the plurality of wireless communication networks in response to the determined intensity level of the first and second wireless communication signals.

12. The method of claim 11, further comprising the step of: comparing the determined intensity level of the first and second wireless communication signals, such that the control logic circuit causes the switching to one of the plurality of wireless communication networks based on the comparison.

13. The method of claim 11, wherein the switching is performed in response to comparing the determined intensity level of the first and second wireless communication signals.

14. The method of claim 11, wherein the determined intensity level of the wireless communication signal includes a rate of data transmission over the plurality of wireless communication networks.

15. The method of claim 11, wherein the determined intensity level of the wireless communication signal includes a number of cellular transmission antennas in a region.

16. The method of claim 11, wherein the determined intensity level of the wireless communication signal includes a number of wireless access points in a region.

17. An in-vehicle communication system configured to roam between a cellular telephony network and a wireless internet protocol network, the system comprising:
- a wireless transceiver module configured to transmit to and receive a wireless communication signal transmitted from the plurality of wireless communication networks;
- a control logic circuit configured to measure an intensity of the wireless communication signal;
- a switching module configured to facilitate roaming between a cellular telephony network and a wireless internet protocol network based on the intensity of the wireless communication signal measured by the control logic circuit; and
- a location determining system configured to provide vehicle location information, and is further configured to facilitate locating at least one of the cellular telephony network or the wireless internet protocol network.

* * * * *